Patented May 4, 1948

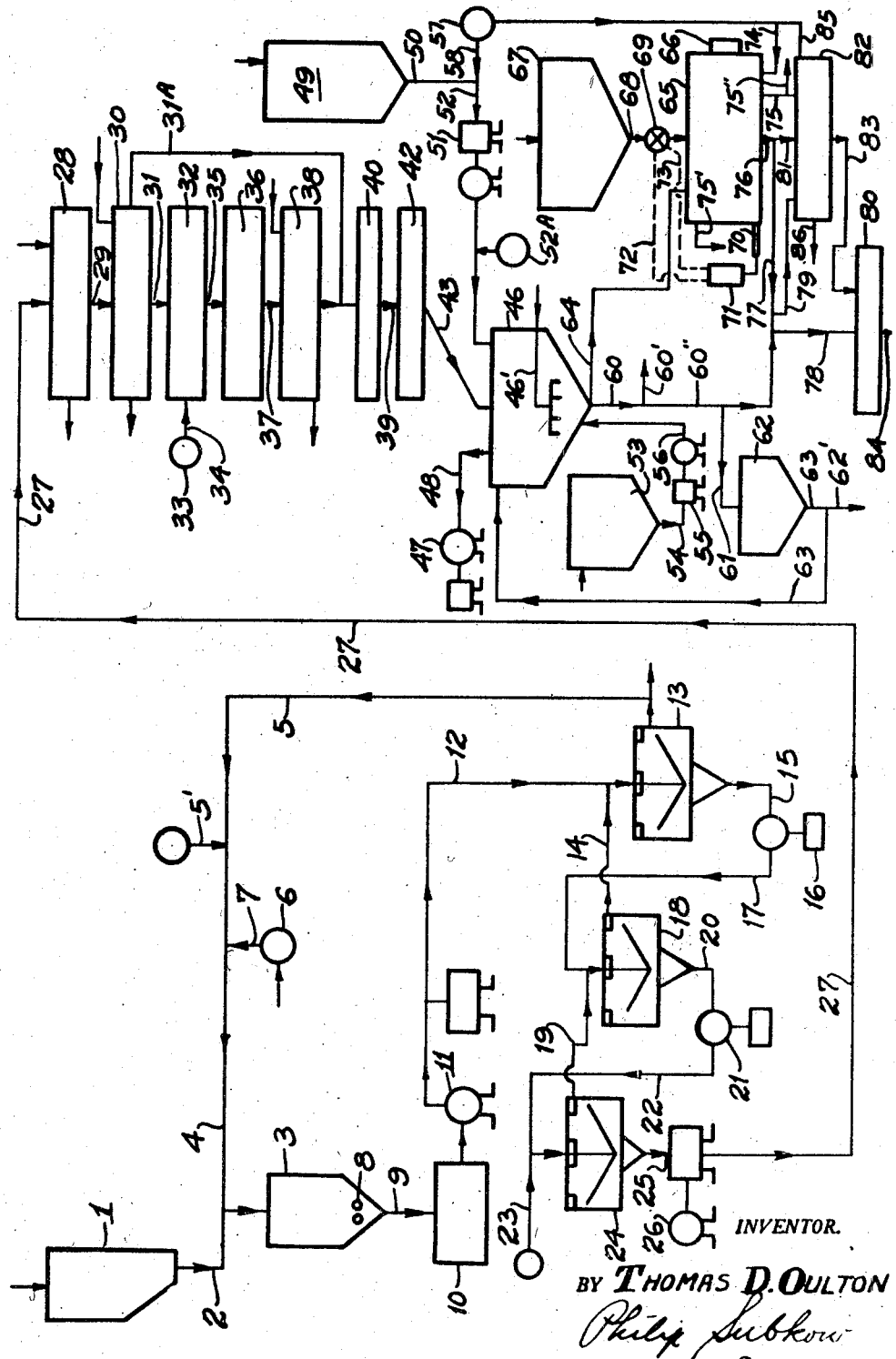

2,440,756

UNITED STATES PATENT OFFICE 2,440,756

METHOD OF PRODUCING CATALYST

Thomas Dixon Oulton, Los Angeles, Calif., assignor to Filtrol Corporation, Los Angeles, Calif., a corporation of Delaware Application October 13, 1944, Serial No. 558,575

8 Claims. (Cl. 252—250)

This invention relates to a method for producing active catalysts and adsorbents. It relates particularly to activated montmorillonite clay catalysts.

As is well known, active catalysts and adsorbents may be made by activating, with acid, sub-bentonites, particularly the montmorillonite clays bearing calcium and magnesium in base exchange position. The acid-activated clay may be further improved in catalytic activity by incorporating therein promoter compounds, for example, hydrated oxides of promoter metals, such for example as hydrated alumina. Such compounds are incorporated in the acid activated clay by reacting soluble salts or salts or compounds of metals, such for example aluminum, with alkali at a pH of about 4 to about 9, and impregnating the clay with the reaction product. Such compounds of aluminum, called "hydrated alumina," have been found to increase the catalytic activity of the acid activated clay, particularly as catalysts in the cracking of petroleum oil.

I have found that an improved catalyst of greater catalytic efficiency and particularly of greater catalytic stability may be obtained by impregnating a calcined acid-treated clay with the hydrated oxides of aluminum, chromium, titanium, cobalt, molybdenum, zirconium, and other hydrated oxides having catalyst promotion characteristics. These oxides may be formed by reaction between a salt or other compound of the metal and a base under suitable pH control. They will be referred to hereafter as the compounds of promoter metals or hydrated oxide of a promoter metal. I prefer however to impregnate my calcined catalyst with an alumina hydrate which I obtain from an aluminum salt. The product thus produced has the unique characteristic that it has a high catalytic stability in that its catalytic activity does not depreciate with repeated cycles of catalytic reaction and regeneration as compared with an impregnated catalyst which is formed by impregnating a like acid-treated clay but without such an intermediate calcination step.

The process of producing a catalyst by my process is also facilitated, for certain catalytic processes which require the use of coarse mesh or formed sizes of the catalyst employed, by first agglomerating the powdered or granular catalyst forms of greater mesh size as by forming the acid-treated powdered or granular catalyst, such as the above clay catalyst, into pellets or pills prior to calcination and impregnation. Such unimpregnated clay is more readily fashioned into pill or pellet form, or for example as by extrusion, than is the clay to which the promoter compounds, as described above, have been added. The pellet or pill is then calcined. The calcination imparts mechanical strength to the agglomerated shape and also makes it relatively non-slaking in that it may be subjected to impregnation with a promoter compound without disintegration. The calcined pellet or other calcined shape, such as a pill, is then impregnated with the catalyst promoter compound, as for example the hydrated alumina.

In my invention I prefer to use as a starting material the acid activatable clays which, after acid activation, have been employed heretofore both as decolorizing adsorbents and as catalysts. As previously stated, such clays normally are the sub- or meta-bentonites of the montmorillonite family and carry calcium and magnesium montmorillonite clays. The analysis of a representative example of such raw clays is as follows:

| | Per cent |
|---|---|
| Silica ($SiO_2$) | 67.3 |
| Titanium oxide ($TiO_2$) | 0.3 |
| Aluminum oxide ($Al_2O_3$) | 19.5 |
| Ferric oxide ($Fe_2O_3$) | 1.8 |
| Manganese oxide (MnO) | 0.8 |
| Magnesium oxide (MgO) | 6.9 |
| Calcium oxide (CaO) | 3.2 |

It has been shown that such clays, when leached with a mineral acid, such as sulphuric, hydrochloric, nitric, or other strong acid, so as to extract a portion of the alumina and a considerable proportion of the calcium and magnesium content of the clay, become very active as adsorbents and catalysts. The degree of such leaching may vary to produce a clay from about 10% to 20% more or less of $R_2O_3$, defining $R_2O_3$ as alumina and iron oxide. The resultant clay or other clays having like characteristics are active catalysts and adsorbents.

It has also been shown that the activity of such clays as catalysts, particularly as catalysts for the cracking of petroleum, is improved by the incorporation into the clay of hydrated alumina or the hydrated oxides of the promoter metals previously referred to. I have found that the said compounds of aluminum are particularly useful to promote the catalytic activity of the acid-treated montmorillonite clay. In such procedures a slurry of such acid-treated clay is mixed with a solution of an aluminum salt, such as, for example, aluminum sulfate. The hydroxylated aluminum compound is thus formed by a chemical reaction of the aluminum salt with a base, preferably ammonia. The reaction between the aluminum sulfate and the base forms a hydroxylated aluminum compound and the hydroxylated aluminum compound is incorporated as hydrated oxide in the acid activated montmorillonite clay.

The hydrated alumina may be incorporated into the acid-activated clay as a step following activation. As previously mentioned, it has also been the present practice in certain catalytic conversion operations to use acid-activated clay, subsequently impregnated with, e. g., hydrate of alumina, in a broad range of mesh sizes and also in coarse mesh or formed shapes. For this latter purpose such finely ground impregnated catalytic clays are formed into pills or pellets, for example by extrusion. Such pellets or pills are usually of a diameter of $\frac{1}{16}$" to $\frac{1}{8}$" and about the same in length. All of such clays may be subjected to high temperatures, such as 900–1050° F. either as a preparatory treatment prior to use in catalytic processes, such as catalytic cracking, or are subjected to such temperatures during the course of such use in such catalytic processes or in the regeneration steps employed in such processes. This step is known as calcination, and the resultant product is known as calcined material. The resulting catalytically active particles or pellets are hard and resist crushing and abrasion. This property is important in the service to which such catalysts are put. They have the additional property of being stable when wetted and will not readily break up when immersed in water. Such pellets may be said to be relatively non-slaking.

I have found that improved catalysts may be made and the process of production simplified by first pelleting and then calcining the pellets of acid-treated clay or calcining either all or a selected portion of the activated clay particles and subsequently impregnating such calcined activated clay particles or pellets with such hydrated alumina.

The acid-activated clay particles on which the previously mentioned hydrated alumina has been subsequently deposited or the calcined particles with or without the addition of promoter compounds are difficult to extrude. They do not have the plasticity of the unimpregnated and activated clay and it is necessary to employ high forming pressures to fashion such impregnated particles into agglomerated shapes, such as pills or pellets. The required high forming pressures also tend to reduce the porosity and hence the usefulness of impregnated clay particles. The activated unimpregnated clay, however, has sufficient plasticity to be readily formed in extrusion or pilling machines at lower pressure than is required for the impregnated clay particles, resulting in a strong pill of increased porosity. The pill may then be calcined to hardened the pellet or pill. The calcination, as described above, hardens and imparts mechanical strength to the pellet or pill. It also makes the shape relatively non-slaking so that it may be immersed in the impregnation solution without disintegration. It is then impregnated with the promoter compound, as described above, and dried.

This invention will be further described by reference to the accompanying drawing which illustrates by schematic flow sheet embodiments of my invention.

The mined clay, such as that for which the above analysis has been given, which has been ground to approximately 8 to 10 mesh or finer mesh, is contained in bin 1.

It is fed by a suitable conveyor system schematically indicated by line 2, into the acid treating chamber 3, into which has been charged acid-water through line 5 via line 4. Additional acid is passed from container 6 and line 7 into treater 3 to supply the desired quantity of acid for treatment. Steam and air are introduced to agitator 8 in treater 3, and the desired temperature of the reaction vessel is maintained in this way at the desired level. For example, I may employ 90 pounds of $H_2SO_4$ (calculated as anhydrous) per 100 pounds of clay (calculated as volatile free), employing a concentration of 12.5% based on the total water content of the mixture. At the end of the reaction in the above example, as for instance at the end of 3 to 4 hours, employing a temperature of 200° F. to 210° F., the acid-treated clay is discharged through line 9 into chamber 10. The slurry of clay and residual acid is pumped by pump 11 into line 12 into a washing system, which may be by decantation as shown in Figure 1. This is schematically shown as three Dorr type thickeners although a larger number may be employed to obtain the desired treatment.

The slurry enters the first thickener 13, where it is mixed with the overflow from thickener 18 passing through line 14. The overflow through line 5 is returned in part through line 4 for use in treater 3 and part of the overflow discharged to waste or for other utilization. Additional water needed to make up the reaction mixture may be added through line 5'. The thickened underflow is pumped through line 15 by pump 16 through line 17 and enters thickener 18 commingled with the overflow from thickener 24 passing through line 19. The underflow passing through line 20 is pumped by pump 21 through line 22, where it is mixed with fresh water entering through line 23 and is introduced into thickener 24. The underflow from thickener 24 passes through line 25 and is pumped by pump 26 through line 27 to filter 28, in which the solids are separated from the liquor, and the solids may be additionally washed. The solids then pass through line 29 into drier and separator 30, wherein various sizes of particles may be separated. All of the dried, activated particles or a part of such particles, as for example the particles of fine mesh sizes, may pass from 30 via line 31 to the pelleting operation or all or the classified particle sized portion, as from about 3 mesh to about 20 mesh, may pass from 30 via line 31a to the subsequently described calcination step in 40 without having been fashioned into pellets or pills.

The dried activated clay particles passing through line 31 are mixed and kneaded with about 40% to 50% water as in pug mill 32. Water from source 33 passing through line 34 also enters pug mill 32. The kneaded clay of suitable plasticity passes through line 35 to a pellet extruder or pill-former 36, wherein the product is fashioned into pellets as previously described. The extruded pellets or fashioned pills pass through line 37 into drier 38 and emerge therefrom through line 39 with a suitable V. M. content, as from about 15% to 20%, into calcination unit 40, wherein the dried, catalytic pelleted material or the unpelleted material previously referred to and which is routed to calciner 40 through conveyor 31a is subjected to a temperature of about 900–1100° F. for a period of about 5 hours. In this process the calcined catalytic pellets or particles are reduced to 4.5% or lower or even down to 1% of volatile content. I prefer however to reduce the pellets to not less than about 3% V. M. in order to preserve their initial catalytic activity.

Additionally, it might prove highly advantageous for certain types of catalytic applications requiring catalysts in mesh sizes larger than, say, 100 mesh size but smaller than would be the usual sizes of pellets or pills formed in the extruder or pill-making machine to submit the calcined extruded pellets to suitable grinding and subsequent classification to yield the required size, which is intermediate between the mesh of the original material from which the pill or pellet is formed and the mesh size of the pill or pellet, for example, in a range of from 30 to 60 mesh.

Instead of employing pelleted or pilled material, I may employ coarse mesh material separated from the above finer particles. Thus the activated catalytic material dried in 30 may be also therein screened or classified to separate the fines and also the coarse meshed particles of a range of from 3 mesh to 20 mesh or finer mesh sizes. Such coarse meshed particles may be separately passed from drier-separator 30 directly to calciner 40, wherein such coarse granules are calcined, as previously described, and impregnated and dried as outlined herein. The calcination of such acid-activated montmorillonite particles prior to impregnation serves to preserve their mesh size suitably through the process of impregnation. I can thus obtain, by suitable classification of the catalyst into separate fractions of various mesh size and separate impregnation of the respective mesh range, usable calcined impregnated catalyst particles ranging from drier 80 from 6 to 30 mesh or finer size for application in certain catalytic processes. However I may also calcine a broad range of particle size from finer than 100 to coarser than 3 mesh, impregnate the mixture, and then dry and separate the various mesh sizes. This procedure however introduces processing difficulties due to the low permeability of such broad range of particle sizes, which introduces difficulties in mixing with impregnating solution, uneven distribution of promoter compound over all particle sizes, difficulties in draining, washing, and filtration. I therefore prefer to impregnate and handle relatively narrow ranges of mesh sizes by first classifying the calcined particles before impregnation.

The calcined catalyst from 40 passes to heat exchanger unit 42, wherein it is reduced to atmospheric temperature, whereupon the cooled material passes by suitable conveyor 43 into impregnation tank 46. I have shown but a single impregnation installation, but the number of such installations may be more than one in parallel for alternate batch operation. When impregnation tank 46 is charged with cooled calcined activated clay in pellets or other coarse forms or sizes, the impregnating tank is suitably evacuated, or to, say, 20" or so of vacuum, through line 48 by vacuum pump 47. When however 46 is charged with calcined activated clay in fine mesh sizes, I find that air evacuation is not essential but that agitation of such fine mesh clay is desirable during the impregnation step with the metallic salt solution, such as aluminum sulphate. Such agitation is shown schematically by 46'. A suitable quantity of aluminum sulphate solution is then drawn by pump 51 from source tank 49 through lines 50 and 52 into 46. If vacuum has been drawn on tank 46, when employing pills or pellets, the vacuum is maintained during addition of the aluminum sulphate.

I have determined from an extensive series of tests that the amount of water in weight which calcined activated clay pellets or particles can absorb will normally range from 45% to 55% with a usual average close to 50% of the weight of the pellets or particles. Since the specific gravity of water is 1, the volume of the voids in cubic centimeters is equal to .5 times its weight in grams. I therefore employ an amount of aluminum sulphate such that the above volume contains sufficient $Al_2(SO_4)_3$ to be equivalent to an amount of $Al_2O_3$ in such $Al_2(SO_4)_3$ equal to from 1% to 7% of the weight of the calcined clay calculated as volatile free.

In order to determine the volume of the voids in the particles or pellets, I place a weighed amount into a closed graduated flask together with a covering quantity of water. I then immediately place the flask under approximately 50 lbs. of pressure. This pressure inhibits the absorption of water into the pores of the pellets or pills. I immediately take a reading of the volume of water. After such reading, the flask is at once placed under a vacuum, thus permitting the water to enter into the pores in the calcined catalyst. I then obtain a second volumetric reading of the flask contents. The difference therefore between the initial and the second reading, which shows the volume absorbed within the pores of the particles or pellets, disclosed the percent of voids contained therein. For example, I have repeatedly found that, if I subject, for instance, 100 grams of calcined particles of the above procedure, they will pick up 50 grams of water. Hence 100 grams of the calcined catalyst material contains a close approximation of 40 to 50 cubic centimeters of voids.

As previously mentioned, after the clay has been steeped in and has imbibed the aluminum salt solution, the hydrated alumina compound is deposited in the calcined particles or pellets by reacting the impregnated salt of the metal employed with a suitable base, such as an alkali metal hydroxide or ammonia and incorporating the same into the calcined clay. I may accomplish this precipitation reaction by employing either an alkali metal hydroxide or ammonium hydroxide. The latter is preferred and may be used either as ammonium hydroxide or ammonia gas.

The calcined activated clay particles, granules, pellets, or pills which are charged into impregnation tank 46 usually are acid in nature. When the metal salt solution, such as aluminum sulphate in suitable concentration, is added to such calcined material at this point, the ammonia is also then added until the particles or pellets are in equilibrium with 4 to 7 pH liquor, preferably to a pH of 5 to 6.

When employing the vacuum previously mentioned, after the pellets or pills have been sufficiently steeped or saturated, i. e., after a period of from 5 minutes to 30 minutes, the tank 46 is repressured to atmospheric pressure by bleeding in air. If calcined fine mesh catalyst is being processed, it is saturated with the $Al_2SO_3$ solution for about 5 to 30 minutes by agitation of the fine mesh solids and the salt solution as previously explained. I thereupon discharge the residue of the aluminum sulphate solution in 46 through lines 60 and 60' to waste, or such residual liquor may be discharged from 46 through lines 60 and 61 to tank 62 for reuse in 46 via line 63 as makeup solution for a subsequent batch treating. Tank 46 is equipped with a suitable screen so as to retain therein the charge of calcined solids during the impregnation process and during the evacuation of the impregnating liquor.

After the solids in 46 are well drained, ammonia gas from source 53 is slowly admitted under suitable pressure into 46 by pump 55 via lines 54 and 56, and as the resultant neutralization reaction is exothermic, the admission of NH₃ is continued until the hot zone created thereby and, as determined by suitable temperature measuring devices, has progressively moved throughout the bed of solids in 46 and the bed has attained uniform temperature. By this means I obtain the desired neutralization reaction of the Al₂SO₃ content in the clay particles uniformly throughout the charge of solids in 46 and thereby bring about the required incorporation of the alumina hydrate into the acid-activated and calcined catalyst.

At this point the feed of NH₃ to 46 is stopped and the bed of impregnated catalytic material in pelleted granular or coarse mesh sizes in 46 is then flushed with tap water from source 57 through lines 58 and 52 and and pump 51 until the discharge from 46 via lines 60 and 60' has a pH of about 8.4. The clay is then washed with wash water as from 52a via line 52 into 46 until the wash solution similarly drained from tank 46 discharges at a pH of about 4 to 7.

The neutralized, washed, and settled catalyst is then well drained in 46 and then discharged from 46 through a suitable opening in the tank and passed via suitable conveyors 60, 60'', and 78 to drier 80, where it is subjected to a temperature of 400° F. for a period of 2 hours to an approximate V. M. of about 7% to 15%, and then discharged to storage via 84. The calcined pellets or pills thus treated have passed through the impregnation without any substantial disintegration and may be passed to use as catalysts.

In the event that catalytic material of finer mesh size constitutes the charge that is impregnated and neutralized in the above manner, for example in a range of mesh sizes which will not drain well when retained in 46, such impregnated and neutralized material is passed in slurry form via 60, 60'', and 79 into filter 82, where the solids are reduced to 50% to 60% V. M. content and wherein the active solids are washed. Such fine mesh material may be washed as previously described on the filter to a range of from 4 to 7 pH of the final wash liquor. Water for washing the separated solids is routed to filter 82 from source 57 through lines 74 and 85, and the wash liquors emerge from filter 82 via line 86 to waste. The separated solids are then discharged via 83 into drier 80 for drying to a V. M. of 10% to 20% and then passed to storage.

Instead of using gaseous ammonia, I may employ a hydroxide solution, such as alkali metal hydroxide or ammonia solution. I prefer however to use NH₄OH.

It is desirable, when employing alkali metal hydroxides, to expose the calcined pellets or particles, into which a suitable incorporation as by steeping of aluminum sulphate has been made, to the alkali ions at such a pH of the solution which will not cause a base exchange between the alkali metal ion and the hydrogen ion of the montmorillonite acid in the calcined catalytic material being impregnated. This is accomplished, as previously mentioned, by maintaining the impregnation solution at a pH not above 7 and preferably 4 to 6. At this pH the alumina hydrate will be deposited in the desirable form within the structure of the calcined catalyst, and the alkali ion will not then base exchange with the acid hydrogen or the hydrogen ions of the montmorillonite.

Thus as an alternative procedure the calcined catalyst in impregnation tank 46, after having been steeped as previously described in a suitable concentration of aluminum sulphate by the previously detailed method, is transferred by suitable conveyor 64 to neutralizing drum 65. At the start of the reaction there is a small amount of water in 65, and the calcined impregnated material is added slowly from tank 46 by conveyor 64 into drum 65, and simultaneously with this slow addition of catalytic material into 65 a suitable charge of NH₄OH flows to 65. The temperature of the ammonium solution may vary from atmosphere to about 150° F. although I prefer to use solution at 110° temperature. The quantity of the ammonium solution added into 65 is such as maintains a pH of the neutralizing liquor 4 to 7 and preferably 5 to 7 pH. The addition is controlled by valve 69, which may be manually operated or which may be automatically controlled by hydrogen electrode 70 of pH meter 71 through control lines 72 and 73 to valve 69. When neutralizing drum 65 has been fully charged and when a final equilibrium pH within a range of 5 or 6 to 7 is obtained, the supernatant liquor in 65 is discharged to waste via line 75'. The solids in the revolving drum of the neutralizing unit are well water-washed from source 57 via line 74. The wash is discharged from the neutralizing drum via lines 75 and 75''.

If the charge of calcined catalytic material now incorporated with hydrated alumina is in a range of coarse mesh sizes or pellets, they will drain well. After they have been suitably washed, as just described, the washing water residue is vented from 65 via lines 75 and 75'' to waste. The drained coarse mesh material or the pellets or pills are then transferred by suitable conveyors 76, 77, and 78 into drier 80, where, as previously described, they are also subjected to a temperature of 400° F. for a period of two hours or to an approximate V. M. of 5% to 15% and are thence discharged to storage via line 84.

If however the charge of calcined material discharged into neutralizing tank 65 from impregnation tank 46 consists of fine mesh material or of particle sizes that would not drain well in neutralizing drum 65, such shaped catalyst particles after treatment in the manner described for the pellets is discharged as a slurry via lines 76 and 81 to filter 82 wherein the solids are filtered out and the liquid is passed via line 86. The filter cake is similarly well washed with water, as previously described, from source 57 via lines 74 and 85 and discharged from filter 82 through line 86. The separated water washed solids are then conveyed via 83 to drier 80 where the solids are similarly dried as previously described.

As examples of the application of this invention, the following is given for purpose of illustration but not as a limitation of my invention.

*Example 1*

The acid activatable clay was treated, as previously described, with 90 lbs. of acid at a concentration of about 12½%, calculated as anhydrous, per 100 lbs. of clay, calculated as volatile free.

The analysis of this activated clay, as produced above, is given below:

| | |
|---|---|
| $SiO_2$ | 81.85 |
| $R_2O_3$ | 11.45 |
| $Fe_2O_3$ | 0.85 |
| $CaO$ | 1.89 |
| $MgO$ | 3.33 |
| $SO_3$ | 2.16 |

The clay for this example and for each of the other examples listed herein was separately extruded to form pellets under the same conditions of extrusion.

The dried cake was mixed with water and formed into pellets of 1/8" diameter and 1/8" long and again dried to a V. M. (total water content) of 20%. This clay was employed as a catalyst in the catalytic cracking of gas oil.

The dried catalyst pellets, such as the acid-treated clay pellet formed as described above, are introduced into an oven maintained at 1050° F. and the pellets are maintained at this temperature for a period of five hours. The catalyst is then cooled without access to air in a desiccator or similar container and upon cooling is transferred to air-tight containers. Two hundred cubic centimeters of the catalyst (i. e., sufficient catalyst pellets to occupy 200 cc.) are then transferred into the cracking chamber of the catalyst cracking unit. The catalyst is raised to 800° F. and a vaporized gas-oil (for example, 35.5–37.5 A. P. I. East Texas gas-oil having 700–730° end-point) is passed through the unit at a rate of 30 liters of liquid oil per hour per 20 liters of catalyst. The exiting vapors from the cracking chamber are condensed at a temperature of 60° F. The condensate thus collected is termed the first-cycle condensate.

At the end of 10 minutes the cracking is discontinued and the catalyst is regenerated by raising its temperature to 950°–975° F. and passing air through the catalyst to convert the deposited carbon into CO and $CO_2$. The exiting gases are then passed to a combustion chamber and any CO is converted to $CO_2$. The passage of air is continued until no substantial amounts of carbon dioxide are present in the exiting gases. The total $CO_2$ is determined and the carbon equivalent thereof is determined.

The air flow is then discontinued and the temperature of the catalyst is reduced to 800° F. and a second cycle of 10 minutes is carried out in the manner previously described. Repeated cycles of regeneration and cracking are carried out. The average of several cycles, excluding the first cycle, is taken. The gasoline is reported as volume percent of condensate; gas, as weight percent of feed; carbon or coke, as weight percent of feed.

The results obtained were as follows:

| | Per cent |
|---|---|
| Weight per cent of gas | 4.6 |
| Weight percent of coke | 2.9 |
| Average percent 410° end-point gasoline | 36.3 |

*Example 2*

The same acid activated calcined montmorillonite pellets which were used as catalyst in the cracking operation described in Example 1 were calcined at a temperature of 1050° for five hours. The calcined pellet had a V. M. of 3% as determined by heating the calcined pellet to 1700° F. for 20 minutes and calculating the percent of loss of weight. The pellets were impregnated in the manner previously described so that the content of hydrated alumina incorporated into such calcined pellets amounted to 5% by weight (calculated as $Al_2O_3$) on a volatile free basis, this impregnation being obtained by absorbing aluminum sulphate solution of such concentration that a volume of the solution in cc. was numerically equal to one-half of the volatile free weight of calcined catalyst pellets being impregnated and contained sufficient $Al_2(SO_4)_3$ (calculated as $Al_2O_3$) equivalent to 5% of the weight of the sample calculated as volatile free. Absorption to complete saturation was insured by carrying on this adsorption at a reduced pressure of about 25 inches of vacuum for about 30 minutes. The vacuum was then released and the excess $$Al_2(SO_4)_3$$

solution was drained off.

Starting with a small volume of water (pH=8), the $Al_2(SO_4)_3$ impregnated pellets were added slowly with simultaneous slow addition of 7% $NH_4OH$ solution, thus maintaining the pH of the supernatant liquor over the pellets at as close to 7 pH as possible and with the incremental additions of pellets and $NH_4OH$ slow enough that there was sufficient time for complete diffusion. In this way, the entire neutralization reaction takes place at about 7 pH. The neutralizing liquor was then decanted and the sample well washed by decantation with water acidified to slightly less than 7 pH.

After draining, the moist pellets were placed in an oven and dried at 350° F. for 4 hours to a V. M. of 7.3%. The impregnated dried pellets were then used as a catalyst in exactly the same manner described under Example 1 and had the following properties:

| | Per cent |
|---|---|
| Weight per cent of gas | 7.6 |
| Weight per cent of coke | 4.6 |
| Average per cent 410 end-point gasoline | 43.7 |

*Example 3*

The catalyst used in this example was prepared in a manner entirely similar to the material used in Example 2 except that $NH_3$ was used to neutralize the aluminum sulfate solution to secure the same quantity of hydrate of alumina.

The catalyst, impregnated with $Al_2(SO_4)_3$ exactly as described in Example 2, was drained and placed in a cylinder through which $NH_3$ gas was passed slowly. The neutralization reaction is exothermic, and passage of $NH_3$ gas was continued until a hot zone had progressively moved from one end of the cylinder, where the $NH_3$ was admitted, to the other end. The catalyst was then flushed with tap water until the pH of the effluent liquor was 8.4. Washing was continued until the wash water was at a pH of 6.5. The catalyst was then drained and dried at 400° F. for 2 hours to attain a V. M. of 5.28%.

After drying similar to the material used in Example 2, it was used as a catalyst in exactly the same manner as described for Examples 1 and 2 and had the following properties:

| | Per cent |
|---|---|
| Weight per cent of gas | 7.9 |
| Weight per cent of coke | 5.3 |
| Average per cent 410° end-point gasoline | 42.6 |

While I have described particular examples of my invention for the purpose of illustration, it should be understood that various modifications and adaptions thereof may be made without departing from the spirit of the invention as set forth in the appended claims.

I claim:
1. In a process for impregnating acid activated clay cracking catalyst particles with a catalyst promoter in which the acid activated clay cracking catalyst particles are subjected to a solution in the process of impregnating, the improvement which comprises calcining said acid activated clay cracking catalyst particles at sufficient temperature and time to substantially reduce the V. M. and render the acid activated clay particles non-slaking but at a temperature not above 1100° F. to avoid destruction of the clay crystal structure and thereafter subjecting resulting calcined acid activated clay particles to said solution in the process of impregnating.

2. In a process for impregnating acid activated montmorillonite sub-bentonite cracking catalyst particles with a catalyst promoter in which the acid activated montmorillonite sub-bentonite cracking catalyst particles are subjected to a solution in the process of impregnating, the improvement which comprises calcining said acid activated montmorillonite sub-bentonite cracking catalyst particles at sufficient temperature and time to substantially reduce the V. M. and render the acid activated montmorillonite sub-bentonite particles non-slaking but at a temperature not above 1100° F. to avoid destruction of the montmorillonite crystal structure of the sub-bentonite and thereafter subjecting resulting calcined acid activated montmorillonite sub-bentonite particles to said solution in the process of impregnating.

3. In a process for impregnating acid activated montmorillonite sub-bentonite cracking catalyst pellets with a catalyst promoter in which the acid activated montmorillonite sub-bentonite cracking catalyst pellets are subjected to a solution in the process of impregnating, the improvement which comprises calcining said acid activated montmorillonite sub-bentonite cracking catalyst pellets at sufficient temperature and time to substantially reduce the V. M. and render the acid activated montmorillonite sub-bentonite pellets non-slaking but at a temperature not above 1100° F. to avoid destruction of the montmorillonite crystal structure of the sub-bentonite and thereafter subjecting resulting calcined acid activated montmorillonite sub-bentonite pellets to said solution in the process of impregnating.

4. In a process for impregnating acid activated montmorillonite sub-bentonite cracking catalyst particles with alumina in which the acid activated montmorillonite sub-bentonite cracking catalyst particles are subjected to a solution of an aluminum compound to saturate said particles therewith, further subjected to a hydrated alumina precipitating agent, and washed to remove soluble salts, in the process of impregnating, the improvement which comprises calcining said acid activated montmorillonite sub-bentonite cracking catalyst particles at sufficient temperature and time to substantially reduce the V. M. and render the acid activated sub-bentonite particles non-slaking but at a temperature not above 1100° F. to avoid destruction of the montmorillonite crystal structure of the sub-bentonite and thereafter subjecting resulting calcined acid activated sub-bentonite particles to said solution, precipitation of hydrated alumina, and washing, in the process of impregnating.

5. Process as defined in claim 4 in which said aluminum compound is aluminum sulfate and said precipitating agent ammonium hydroxide.

6. In a process for impregnating acid activated montmorillonite sub-bentonite cracking catalyst pellets with alumina in which the acid activated montmorillonite sub-bentonite cracking catalyst pellets are subjected to a solution of an aluminum compound to saturate said pellets therewith, further subjected to a hydrated alumina precipitating agent, and washed to remove soluble salts, in the process of impregnating, the improvement which comprises calcining said acid activated montmorillonite sub-bentonite cracking catalyst pellets at sufficient temperature and time to substantially reduce the V. M. and render the acid activated sub-bentonite pellets non-slaking but at a temperature not above 1100° F. to avoid destruction of the montmorillonite crystal structure of the sub-bentonite and thereafter subjecting resulting calcined acid activated sub-bentonite pellets to said solution, precipitation of hydrated alumina, and washing, in the process of impregnating.

7. Process as defined in claim 6 in which said aluminum compound is aluminum sulfate and said precipitating agent ammonium hydroxide.

8. Process as defined in claim 6 in which the pellets are drained after subjection to said solution and hydrated alumina is precipitated in said pellets by contacting said pellets with gaseous ammonia.

THOMAS DIXON OULTON.

REFERENCES CITED

The following references are of record in the file of this patent:

UNITED STATES PATENTS

| Number | Name | Date |
| --- | --- | --- |
| 1,837,971 | Joseph | Dec. 22, 1931 |
| 1,933,067 | Nickell | Oct. 31, 1933 |
| 2,139,026 | Matheson | Dec. 6, 1938 |
| 2,141,185 | Houdry | Dec. 27, 1938 |
| 2,229,361 | Bertsch | Jan. 21, 1941 |
| 2,265,682 | Bennett et al. | Dec. 9, 1941 |
| 2,320,799 | Ruthruff | June 1, 1943 |
| 2,330,685 | Connolly | Sept. 28, 1943 |
| 2,388,735 | Gary et al. | Nov. 13, 1945 |
| 2,391,312 | Erving et al. | Dec. 18, 1945 |
| 2,397,505 | Richardson | Apr. 2, 1946 |
| 2,398,899 | Teter | Apr. 23, 1946 |
| 2,400,020 | Pierce et al. | May 7, 1946 |

FOREIGN PATENTS

| Number | Country | Date |
| --- | --- | --- |
| 490,853 | Great Britain | Aug. 23, 1938 |